Aug. 28, 1962 E. H. WEBER, JR 3,051,854
TRANSISTORIZED SWITCHING CIRCUIT HAVING BIPOLAR CONTROL
Filed Aug. 3, 1959

INVENTOR
E. H. WEBER, JR.
BY
Charles Scott Phelan
ATTORNEY 3,051,854

TRANSISTORIZED SWITCHING CIRCUIT HAVING BIPOLAR CONTROL

Edward H. Weber, Jr., Chatham Township, Morris County, N.J., assignor to Bell Telephone Laboratories, Incorporated, New York, N.Y., a corporation of New York Filed Aug. 3, 1959, Ser. No. 831,429
12 Claims. (Cl. 307—88.5)

This invention relates to a transistor selector switch which is controlled by a first input signal for selectively coupling one of a plurality of further input signals to a single output circuit.

In certain situations it is convenient to be able to use a first signal to control the selection of one signal out of a number of other signals, and it is sometimes necessary that the first signal be of a smaller magnitude than any of the signals from which the selection is to be made. For example, it is often necessary to be able to reverse the phase of an alternating current signal, or to be able to select one of a plurality of signal channels for coupling to a single output circuit. Selector switches which are either manually or electromagnetically operated are subject to the usual difficulties with moving parts, contact surface problems and the like. Electronic switches such as known electron tube and transistor circuits and steering diode arrangements are generally rather complex and usually require a separate source of operating energy in addition to the input controlling and controlled signals. Also, steering diodes usually require the use of a control signal comparable in magnitude to the controlled signal.

Accordingly, it is an object of this invention to simplify selective switching circuits.

An additional object is to increase the reliability of switching circuits.

Another object is to facilitate signal selection via transistors under the control of a signal which has a small magnitude relative to the magnitude of the controlled signals.

A further object is to reduce the number of energy sources required for electronic selective switching arrangements.

These and other objects of the invention are realized in an illustrative embodiment thereof in which two input circuits are nongalvanically connected to the collector electrodes of two transistors. Each of the transistors has only nongalvanic connections to its collector electrode. A direct current bias signal is applied to the base electrodes of the transistors for biasing either transistor on and the other transistor off in response to different relative polarities of the two base electrodes to connect either one of the two input circuits to a single output circuit.

Figure 1:
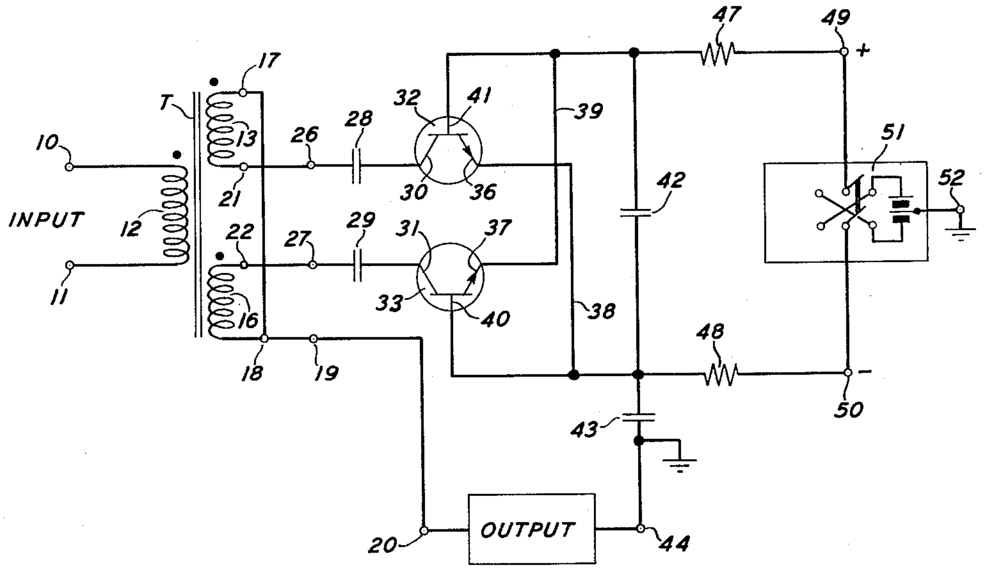
Figure 2:
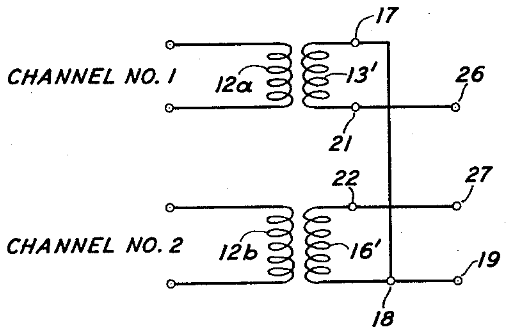

A more complete understanding of the invention, together with further advantages and features, may be obtained upon a consideration of the following detailed description and the appended claims taken together with the attached drawing in which:

FIG. 1 is a schematic diagram of a transistor selector switch in accordance with the invention for reversing the phase of an alternating current signal, and FIG. 2 is a schematic diagram of a modified input portion for the selector switch of FIG. 1 suitable for use as a channel selector.

Referring to FIG. 1, input signals are applied via input terminals 10 and 11 to a primary winding 12 of a transformer T which includes two secondary windings 13 and 16. The windings of transformer T are polarized so that the upper terminal connection of each winding, as illustrated in FIG. 1, has the same instantaneous polarity relative to the corresponding lower terminal thereof as indicated by the dots adjacent to the respective windings. The terminals 17 and 18 of windings 13 and 16, respectively, are connected in common to a junction 19 which is also connected to an ungrounded output terminal 20. Terminals 17 and 18 are of opposite relative instantaneous polarity. Terminals 21 and 22 of windings 13 and 16, respectively, are also of opposite relative instantaneous polarity with respect to one another and are nongalvanically connected via the junctions 26 and 27 and capacitors 28 and 29 to collector electrodes 30 and 31 of transistors 32 and 33, respectively. These transistors are schematically illustrated as N-P-N transistors but, of course, other transistors having at least three electrodes would be equally suitable in this application. Emitter electrodes 36 and 37 of transistors 32 and 33, respectively, are cross connected by leads 38 and 39 to base electrodes 40 and 41 of transistors 33 and 32, respectively. Base electrodes 40 and 41 are also interconnected by a capacitor 42.

Thus, corresponding pairs of electrodes of transistors 32 and 33 are provided with similar connections. Collector electrodes are coupled to input transformer windings; emitter electrodes are cross coupled to base electrodes of each other transistor; and base electrodes of the two transistors are interconnected by means of capacitor 42. Base electrode 40 is also further connected via a capacitor 43 to a grounded output terminal 44. Each of the capacitors 28, 29, 42, and 43 serves in the dual functions of blocking direct currents and of presenting a low impedance to alternating currents at the frequency of the input signal.

Base electrodes 21 and 40 are further connected via current-limiting resistors 47 and 48 to the input terminals 49 and 50 ofa source 51 of bipolar direct current. Source 51 can also be provided with an intermediate terminal 52 which is connected to ground, I but this is not essential to the invention. As will be hereinafter described in connection with the operation of the invention, it is only necessary that source 51 supply to transistors 32 and 33 a potential which is sufficient to bias one base electrode thereof a few tenths of a volt more positively than the other base electrode. Thus, source 51 may be any suitable source to provide such a potential difference. For example, it could be a bistable multivibrator, or it could be a battery and a reversing switch, as shown in FIG. 1, with or without a ground connection to any terminal on the battery. If a ground connection is not provided on source 51, it is also not necessary to include capacitor 43 in the circuit, and output terminal 44 may be connected directly to base electrode 40.

Considering now the operation of the circuit of FIG. 1, assume that source 51 provides a control potential such that terminal 49 is more positive than terminal 50 as indicated by the plus and minus signs adjacent these terminals in FIG. 1. This control potential biases base electrode 41 more positively than emitter electrode 36 in transistor 32 and similarly biases emitter electrode 37 more positively than base electrode 40 in the transistor 33. With this bias condition, transistor 32 has the base-emitter junction thereof forward biased and tends to conduct while transistor 33 has the base-emitter junction thereof reversely biased and tends to be nonconducting.

Assume that on the first positive half cycle of the alternating current signal applied to input terminals 10 and 11, terminal 10 is positive with respect to terminal 11. Terminals 17 and 22 of secondary windings 13 and 16 are also positive with respect to terminals 21 and 18, respectively, of these windings. Accordingly, winding 13 tends to drive a current through a first loop circuit including the rectifying base-collector junction of transistor 32. This loop circuit extends from terminal 17 through terminal 18, junction 19, terminal 20, the output circuit, terminal 44, capacitor 43, capacitor 42, base electrode 41, collector electrode 30, capacitor 28, junction 26, and terminal 21 of winding 13. The current flowing in the aforementioned path through transistor 32 tends to charge capacitor 28 so that the terminal thereof which is connected to collector electrode 30 is more positive than the other terminal thereof.

Secondary winding 16 tends to drive a current from terminal 22 through junction 27 and capacitor 29 to collector electrode 31 of transistor 33. However, the potential across winding 16 reversely biases the collector-base junction of transistor 33; and since the base-emitter junction thereof is also reversely biased, no substantial current can flow in this path.

On the first negative half cycle of the input signal, the polarities of the transformer windings are reversed and terminals 11, 21, and 18 are more positive than the terminals 10, 17, and 22, respectively. Now the potential difference across secondary winding 13 tends to drive a current through a second loop circuit which includes terminal 21, junction 26, capacitor 28, collector electrode 30, emitter electrode 36, lead 38, capacitor 43, terminal 44, the output circuit, terminal 20, junction 19, terminal 18, and terminal 17 of winding 13. In this path the aforementioned charge on capacitor 28 is reduced and the capacitor is recharged with opposite polarity. The current flowing in this second loop circuit is a function of the potential across winding 13 and of the potential difference between base electrode 41 and emitter electrode 36 as is well known in the art.

Winding 16 tends to drive a current in a loop circuit which includes terminal 18, junction 19, terminal 20, the output circuit, terminal 44, capacitor 43, base electrode 40, collector electrode 31, capacitor 29, junction 27, and terminal 22 of secondary winding 16. In this circuit capacitor 29 becomes charged such that its terminal which is connected to collector electrode 31 is more positive than the other terminal thereof. This conduction takes place in the base-collector rectifying junction of transistor 33 even though the base-emitter junction thereof is reversely biased. Current continues to flow in the last-mentioned loop circuit either until the potential across winding 16 reverses or until capacitor 29 attains the maximum charge equal to the peak voltage appearing across winding 16 less the voltage across the output circuit and the capacitor 43.

On the second positive-going half cycle of the input voltage, transistor 32 conducts through its rectifying base-collector junction as hereinbefore described for the first positive half cycle. Voltages across winding 16 and capcitor 29 are series-aiding and tend to drive a current through the base-collector junction of transistor 33, but substantially no current flows because the potential applied thereto is of the wrong polarity as hereinbefore mentioned. The charge on capacitor 29 resulting from current flow on the first negative-going half cycle of the input voltage remains substantially unchanged.

On the second negative-going half cycle of the input signal, transistor 32 once again conducts in its collector-emitter circuit as a transistor as hereinbefore described in connection with the first negative half cycle of the input signal. In the circuit of transistor 33, however, the charge remaining on capacitor 29 opposes the input signal voltage on winding 16. Current flow in the base-collector circuit of transistor 33 is limited to the amount necessary to raise the charge on capacitor 29 to its previously-mentioned maximum charge. Thereafter, transistor 32 conducts in the loop circuit with secondary winding 13; and transistor 32 functions either as a transistor with its collector-emitter circuit in the loop or as a rectifier with its base-collector circuit in the loop, depending upon the instantaneous polarity of the potential across winding 13. Transistor 33, however, is able only to conduct a sufficient current on negative half cycles to replace charge which leaks off capacitor 29 during positive half cycles once capacitor 29 has become substantailly fully charged. It should be noted at this point that when transistor 32 is the principal conducting transistor, as hereinbefore described, output terminal 20 is positive with respect to ground when input terminal 10 is more positive than input terminal 11 and, similarly, output terminal 20 is negative with respect to ground when input terminal 10 is negative with respect to terminal 11.

If collector capacitor 29 were eliminated from the circuit and collector electrode 31 were connected directly to junction 27, the operation of the circuit would be substantially different on the negative half cycles of the input voltage. Under this condition, transistor 33 would not have its base-collector circuit externally blocked by a charged capacitor and could therefore conduct when terminal 18 of secondary winding 16 is more positive than terminal 22 thereof. Accordingly, the potential across winding 16 would tend to make output terminal 20 positive with respect to ground while the potential across secondary winding 13 would, at the same time, tend to make output terminal 20 negative with respect to ground and by substantially the same voltage. Accordingly, the output voltage between terminals 20 and 44 would be essentially zero in response to negative input voltages. It will be seen from the subsequent description of the operation of this circuit when transistor 33 is conducting and transistor 32 is nonconducting that if capacitor 28 were also removed from the circuit there would be no output voltage for either half cycle of the input signal.

Assuming now that the control signal from source 51 is reversed from the condition illustrated in FIG. 1 to the condition in which terminal 50 is more positive than terminal 49, transistor 33 tends to conduct because its base-emitter junction is forward biased and transistor 32 tends to be nonconducting because its base-emitter junction is reversely biased. The operation in this condition is similar to that hereinbefore described except that the different transistors are now conducting. In either condition, the conducting transistor conducts as a rectifier in its base-collector junction when that junction is forward biased by the half cycles of the input signal voltage of one polarity; and it conducts as a transistor in its collector-emitter circuit when that circuit is forward biased by alternate half cycles of the input signal voltage of the opposite polarity. The conducting transistor can conduct as a transistor in its collector-emitter circuit only if its collector-base junction is reverse biased and its base-emitter junction is forward biased. It can conduct as a rectifier in its collector-base junction only when a previous half cycle of collector-emitter conduction has removed the opposing charge from its series capacitor 28, or 29.

It will be observed that with transistor 33 conducting and transistor 32 nonconducting the output terminal 20 is now positive with respect to ground when input terminal 11 is positive with respect to terminal 10 and output terminal 20 is negative with respect to ground when input terminal 11 is negative with respect to terminal 10. This is just the opposite phase condition hereinbefore described for the condition in which transistor 32 was conducting. It must be noted, however, that the phase relationship is a function of the manner in which windings 13 and 16 are wound with respect to one another and the way in which they are connected to the output terminals. The polarity of the control voltage from source 51 determines which of the two secondary windings 13 and 16 shall be controlling with respect to the output voltage.

In summary with respect to FIG. 1, each input secondary winding is included in two series loop circuits with its respective transistor and with the output terminals 20 and 44. A control signal source permits only one of the transistors to conduct a substantial current. In one of the two loop circuits, the conducting transistor base-collector junction conducts as a rectifier, and in the other loop circuit, the conducting transistor collector-emitter circuit conducts as a transistor. Thus, the selected input signal is coupled to the output circuit by the conducing transistor operating alternately as a rectifier and as a transistor.

Referring to FIG. 2, the modified input transformer arrangement there illustrated may be utilized in connection with the transistor switch described in connection with FIG. 1 to select the signal from either one of two channels instead of selecting one of two phases of a single input signal. In FIG. 2, signals on channel 1 and channel 2 may be coupled, respectively, to primary windings 12*a* and 12*b* which are in turn respectively coupled to the secondary windings 13′ and 16′. The circuit of FIG. 2 may be substituted for the transformer T of FIG. 1 and connected to the transistor part of the circuit at the terminals 26, 27, and 19 indicated in FIGS. 1 and 2. The operation of the circuit as modified is similar to that hereinbefore described; but now instead of the terminals 17 and 18 being always of opposite relative polarities, they may assume any relative polarity combination at any time in accordance with the input signals applied to primary windings 12*a* and 12*b*. However, the transistor which has its base-emitter junction forward biased will still conduct; and the transistor which has its base-emitter junction reverse biased for nonconduction will conduct only via its base-collector junction and only until its collector capacitor has been charged sufficiently to block further conduction in the base-collector circuit thereof as hereinbefore described. The signal appearing between output terminals 20 and 44 now represents the signal from the input channel which is associated with the conducting transistor regardless of the phase of that signal with respect to the phase of the signal in the other channel.

In either of the embodiments of the invention hereinbefore described, it is only necessary that the control voltage have a magnitude of a few tenths of a volt in order to bias one transistor for conduction and to bias the other transistor for nonconduction. Larger control voltage magnitudes can be accommodated by appropriately designing the size of the current-limiting resistors 47 and 48. There is no specific limit on the magnitude of the input signal with respect to the control signal magnitude. The input signal may be as small as desired as long as it still has sufficient amplitude to forward bias the rectifying conduction path of the conducting transistor. Similarly, the input signal may be as large as is desired within the capability of the type of transistors employed. In certain applications, of course, substantially linear translation of the input signals through the transistors will be desired, and in these applications the input signal magnitude must be held within appropriate limits to avoid distortion which might occur upon the saturation of the transistors.

Although this invention has been described in connection with particular embodiments and applications thereof, it is to be understood that these are by way of illustration, not by way of limitation, and that other embodiments and applications which will be obvious to those skilled in the art are included within the spirit and the scope of the invention.

What is claimed is:

1. A switch circuit comprising two transistors each having a base electrode, an emitter electrode, and a collector electrode and each having its base electrode cross-connected to the emitter electrode of the other transistor, means biasing one of said base electrodes more positively than the other, two input circuits and an output circuit all having one terminal in common with one another, the other terminal of each of said input circuits being connected to the collector electrode of a different one of said transistors, a capacitor connected between said base electrodes, and means connecting one of said base electrodes to another terminal of said output circuit.

2. A switching circuit comprising two transistors each having three electrodes, each of which electrodes corresponds to a like electrode of the other transistor, means applying a direct potential signal of conrollable polarity to a first pair of said like electrodes for biasing one electrode of said pair more positively than the other, means cross-connecting on each transistor an electrode of a second pair of said like electrodes to the one of the electrodes of said first pair which is associated with the other transistor, a connection having high impedance to direct current and low impedance to alternating current connected between the electrodes of said first pair, two alternating current input circuits each having one terminal thereof connected to a different electrode of a third pair of said like electrodes, respectively, and an output circuit connected between one electrode of said first pair and a terminal which is common to both of said input circuits.

3. A switching circuit comprising two transistors each having base, emitter, and collector electrodes, means biasing one of said base electrodes more positively than the other, means cross-connecting each of said base electrodes to the emitter electrode of the other transistor, two input circuits and an output circuit having one terminal in common with one another, the other terminal of each of said input circuits being capacitively connected to the collector electrode of a different one of said transistors, respectively, a capacitor connected between said base electrodes for bypassing alternating current signals around said biasing means, and means connecting one of said base electrodes to another terminal of said output circuit.

4. A phase selecting circuit comprising two transistors each having base, emitter, and collector electrodes and each also having its base electrode cross-connected to the emitter electrode of the other transistor, means selectively biasing one of said base electrodes more positively than the other, a transformer for applying an alternating current input signal to said phase selecting circuit and comprising a primary winding and two secondary windings, an output circuit, means connecting one terminal of said output circuit to terminals of opposite relative polarity of each of said secondary windings, means connecting the other terminal of each of said secondary windings to the collector electrode of a different one of said transistors, a capacitor connected between said base electrodes, and means connecting one of said base electrodes to another terminal of said output circuit.

5. A switching circuit comprising two transistors each having three electrodes each of which electrodes corresponds to a like electrode of the other transistor, means applying a direct potential signal of controllable polarity to a first pair of said like electrodes for biasing one electrode of said pair more positively than the other, means cross-connecting each electrode of a second pair of said like electrodes to the one of the electrodes of said first pair which is associated with the other transistor, a connection having high impedance to direct current and low impedance to alternating current connected between the electrodes of said first pair, two alternating current input circuits each having one terminal thereof capacitively connected to a different electrode of a third pair of said like electrodes, respectively, and an output circuit connected between one electrode of said first pair and a terminal which is common to both of said input circuits.

6. A switching circuit comprising two transistors each having three electrodes and in which each of the three electrodes of one transistor corresponds to a like electrode of the other transistor, means connected to a first pair and a second pair of said like electrodes for biasing either one of said transistors on and the other transistor off, a connection having a high impedance to direct current and low impedance to alternating current interconnecting the electrodes of said first pair, two alternating current input circuits each having one terminal thereof connected to a different electrode of a third pair of said like electrodes, respectively, and an output circuit connected between one electrode of said first pair and a terminal which is common to both of said input circuits.

7. A switching circuit comprising first and second transistors each having base, emitter, and collector electrodes, a transformer having a primary winding for receiving alternating current input signals and having two secondary windings, an output circuit having one terminal connected to ground, means interconnecting another terminal of said output circuit and one terminal of each of said secondary windings to a common junction point, separate capacitors connected between the remaining terminal of each of said secondary windings, respectively, and a different one of said collector electrodes, a bipolar source of direct potential having an intermediate potential point thereon connected to ground, separate current-limiting resistors connecting each terminal of said bipolar source to a different one of said base electrodes, a capacitor connected between said base electrodes, connections between the emitter electrode of each transistor and the base electrode of the other transistor, and a further capacitor connected between one of said base electrodes and said grounded output terminal.

8. A switching circuit responsive to a bipolar direct control voltage for conductively connecting either one of two input circuits to an output circuit, said switching circuit comprising two transistors each having first, second, and third electrodes, each of said transistors also having a rectifying conduction path therethrough which includes said first and second electrodes thereof and which is conductive in response to a potential difference of only one polarity between said first and second electrodes, each of said transistors also having a transistor conduction path therethrough which includes said first and third electrodes thereof and which is conductive in response to a potential difference of only one polarity between said first and third electrodes and also to a potential difference of only one polarity between said second and third electrodes, said transistors being on for potentials of said one polarity between said second and third electrodes and tending to conduct in said transistor conduction path thereof, said transistors being off for potentials of the opposite polarity between said second and third electrodes and tending to be nonconducting in said transistor conduction path, a source of bipolar direct potential connected between the second and third electrodes of each of said transistors with opposite polarity for simultaneously biasing one of said transistors on and the other of said transistors off, means connecting each of said input circuits in a series loop circuit with said output circuit via the rectifying conduction path of one of said transistors for alternating current half cycles of a first polarity in said input circuit and via the transistor conduction path of said one transistor for alternating current half cycles of a second polarity in said input circuit.

9. The switching circuit in accordance with claim 8 in which a separate capacitor is connected in each of said series loop circuits between the input circuit thereof and the first electrode of the corresponding transistor for blocking the flow of direct current in such loop circuits.

10. The switching circuit in accordance with claim 9 in which said connecting means includes a capacitor connected between the second electrodes of said transistors to be in series with the rectifying conduction path of one of said transistors and the transistor conduction path of the other of said transistors.

11. A phase selecting circuit comprising two transistors each having base, emitter, and collector electrodes and each having its base electrode cross-connected to the emitter electrode of the other transistor, an input circuit comprising a transformer having a primary winding for receiving alternating current, said transformer also having two secondary windings, an output circuit having one terminal thereof connected in common with one terminal of each of said secondary windings, the voltages at said one terminal of said secondary windings being of opposite phase, two capacitors each connected between the other terminal of a different one of said secondary windings and the collector electrode of a different one of said transistors, respectively, a further capacitor connected between said base electrodes, means connecting one of said base electrodes to another terminal of said output circuit, and means selectively biasing one of said base electrodes more positively than the other thereby conductively connecting to said output circuit the secondary winding which is associated with the transistor with which said one base electrode is associated.

12. A switching circuit comprising two transistors each having base, emitter, and collector electrodes, means biasing one of said base electrodes more positively than the other, means cross-coupling each of said emitter electrodes to the base electrode of the other transistor, only nongalvanic means connected to said collector electrodes, two input circuits and an output circuit all having one terminal in common with one another, the other terminal of each of said input circuits being capacitively coupled to the collector electrode of a different one of said transistors, respectively, a capacitor connected between said base electrodes, and means connecting one of said base electrodes to another terminal of said output circuit.

References Cited in the file of this patent

UNITED STATES PATENTS

| | | |
|---|---|---|
| 2,820,143 | D'Nelly et al. | Jan. 14, 1958 |
| 2,942,124 | Kistler | June 21, 1960 |